(12) United States Patent
Sengupta et al.

(10) Patent No.: US 10,397,655 B2
(45) Date of Patent: Aug. 27, 2019

(54) CONTENT ONBOARDING AND CUSTOM CHANNEL LINEUP PROVISIONING

(71) Applicant: Verizon Patent and Licensing Inc., Arlington, VA (US)

(72) Inventors: Ballori Sengupta, San Jose, CA (US); Sridhar Reddy, Sunnyvale, CA (US); Jacob Alan Papanek, Los Angeles, CA (US); Andrew S. Kleppinger, Harleysville, PA (US); Michael Parker, Santa Cruz, CA (US); Frederick G. Wade, Oakland, CA (US); Stefan Estrada, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 16 days.

(21) Appl. No.: 15/648,024

(22) Filed: Jul. 12, 2017

(65) Prior Publication Data

US 2019/0020921 A1    Jan. 17, 2019

(51) Int. Cl.
| | |
|---|---|
| *H04N 21/462* | (2011.01) |
| *H04N 21/266* | (2011.01) |
| *H04N 21/258* | (2011.01) |
| *H04N 21/254* | (2011.01) |
| *H04N 21/45* | (2011.01) |
| *H04N 21/4623* | (2011.01) |
| *H04N 21/4627* | (2011.01) |
| *H04N 21/482* | (2011.01) |

(52) U.S. Cl.
CPC ....... *H04N 21/462* (2013.01); *H04N 21/2541* (2013.01); *H04N 21/25841* (2013.01); *H04N 21/25875* (2013.01); *H04N 21/266* (2013.01); *H04N 21/4524* (2013.01); *H04N 21/4623* (2013.01); *H04N 21/4627* (2013.01); *H04N 21/4821* (2013.01)

(58) Field of Classification Search
CPC .................................................. H04N 21/482
See application file for complete search history.

(56) References Cited

U.S. PATENT DOCUMENTS

| | | | | |
|---|---|---|---|---|
| 8,869,207 | B1 * | 10/2014 | Earle | H04N 21/4622 725/37 |
| 2002/0151327 | A1 * | 10/2002 | Levitt | G06F 17/30867 455/556.1 |

(Continued)

*Primary Examiner* — Michael H Hong

(57) ABSTRACT

A device can receive configuration information associated with a set of channels to be provided as part of an Internet protocol television (IPTV) service. The device can receive information associated with a set of channel categories after receiving the configuration information associated with the set of channels. The device can receive information associated with a set of channel lineups after receiving the information associated with the set of channel categories. The device can receive information associated with a user device that is associated with the IPTV service. The device can generate, based on the information associated with the user device and the channel configuration information, a custom channel lineup using the information associated with the set of channel lineups. The device can provide, to the user device, the custom channel lineup to permit the user device to provide, for display, information associated with the custom channel lineup.

20 Claims, 11 Drawing Sheets

(56) References Cited

U.S. PATENT DOCUMENTS

| | | | |
|---|---|---|---|
| 2008/0155595 A1* | 6/2008 | Stallings | H04N 5/44543 725/39 |
| 2014/0172891 A1* | 6/2014 | Amidei | G06F 17/3087 707/758 |
| 2015/0382037 A1* | 12/2015 | Huang | H04N 21/25875 725/28 |
| 2016/0142743 A1* | 5/2016 | Nielsen | H04N 21/2358 725/54 |
| 2017/0013299 A1* | 1/2017 | Duet | H04N 21/2343 |

* cited by examiner

CONTENT ONBOARDING AND CUSTOM CHANNEL LINEUP PROVISIONING

BACKGROUND

Customer devices (e.g., television set-top boxes, or the like) can receive both traditional television signals, via a dedicated connection, and Internet protocol (IP)-based data services, via an Internet connection. Video content delivered to the customer devices via an IP-based packet network can be referred to as over-the-top (OTT) delivery. OTT video content can include, for example, live content streams, pre-recorded video content (e.g., television episodes, movies, etc.), and content associated with video portals provided by content providers.

DETAILED DESCRIPTION OF PREFERRED EMBODIMENTS

Figure 1A:
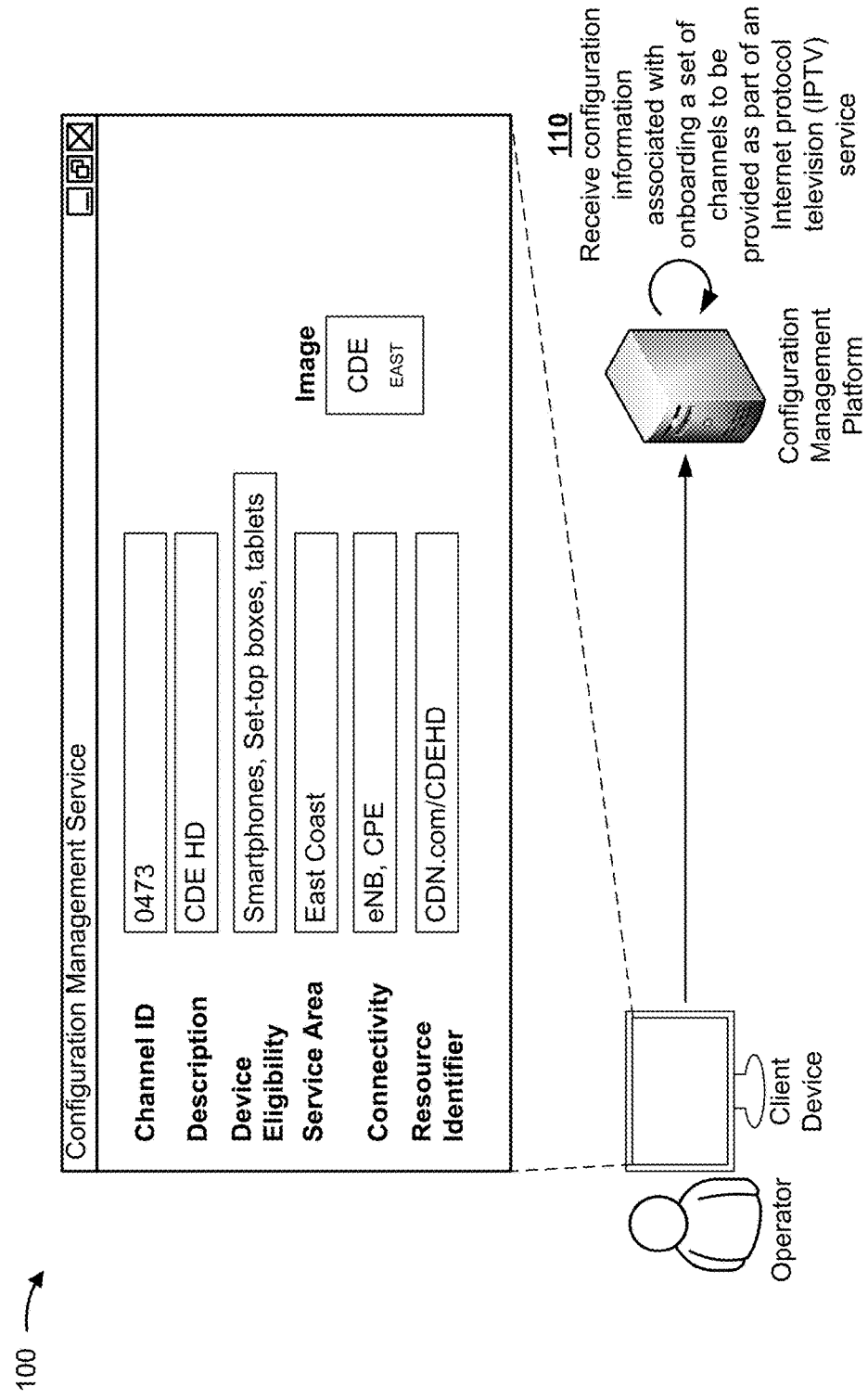
FIGS. 1A-1H are diagrams of an overview of an example implementation described herein.

The following detailed description of example implementations refers to the accompanying drawings. The same reference numbers in different drawings can identify the same or similar elements.

A telecommunications service provider can provide Internet Protocol Television (IPTV) services to subscribers. As part of offering the IPTV services, acquisition and/or encoding devices (e.g., server devices) can receive signal streams from various content sources (e.g., signal streams associated with streaming media content, such as video content).

Additionally, the acquisition and/or encoding devices can transcode the signals using a particular codec, such as a Motion Pictures Experts Group (MPEG) codec (e.g., MPEG-4), and can partition the streaming media content into multiple files (e.g., transport stream (TS) files). Additionally, origin servers and/or content delivery network (CDN) servers can store (e.g., cache) the files associated with the streaming media content, thereby enabling user devices to request and receive the streaming media content (e.g., using IP infrastructure). Further, the above devices can transcode and distribute streaming media content for a wide variety of content sources (e.g., channels).

Content onboarding can refer to the process of configuring a channel such that content associated with the channel can be received by user devices in association with an IPTV service. As part of the content onboarding process, a content management team might configure a channel with particular configuration information, such as a description of the channel that is to be provided for display by user devices, resource identifier information that permits user devices to request and receive content from CDN servers, a service area (e.g., a set of geolocations) to which the channel is applicable, or the like.

Additionally, the content management team might add a configured channel to a channel category. For example, a channel category can refer to a set of channels that might share some characteristic, some common theme, or the like. As an example, a "sports" category can include a set of sports channels, a "news" category can include a set of news channels, etc.

Further still, the content management team might add a channel category (and the associated channels) to a channel lineup. A channel lineup can refer to a set of channel categories and/or channels. A user device can provide, for display, information associated with a channel lineup such that a user can navigate, interact with, select, etc. particular channel categories and channels of the channel lineup when using the IPTV service.

A content management team might be required to configure the channels for use in association with multiple IPTV services. For example, in practice, the content management team might be required to configure hundreds or thousands of channels for multiple IPTV services. In some cases, the content management team might be required to separately perform channel onboarding for each IPTV service. As such, channel onboarding can prove time intensive, redundant, error prone, etc.

Some implementations described herein provide a configuration management platform that can receive configuration information associated with a set of channels, and use the configuration information to configure a set of IPTV services to permit the channels to be provided in association with the multiple IPTV services.

By enabling an operator to configure a set of channels with particular configuration information, add the channels to a set of channel categories, add the channel categories to a set of channel lineups, and select a set of services that are eligible to use the set of channel lineups, some implementations described herein reduce an amount of configuration and time associated with channel onboarding. In this way, some implementations described herein conserve network resources and/or conserve processor and/or memory resources of devices associated with channel onboarding.

Additionally, some implementations described herein provide a configuration management platform that can generate a customized channel lineup for a user device. As used herein, a custom channel lineup can refer to a channel lineup that is determined based on information that can be specific to a particular user device (e.g., a geolocation of the user device, a device type of the user device, demographic information associated with a user of the user device, behavioral information associated with a user of the user device, access point and/or access network connectivity of the user device, restriction information associated with the user device, or the like).

By providing a configuration management platform that can dynamically generate a customized channel lineup based on user device information and configuration information associated with the set of channels of a channel lineup, some implementations described herein permit the configuration management platform to provide, to a user device, a customized channel lineup that includes channels that are capable of being provided for playback by the user device, that are applicable to a service area associated with the user device, that are subscribed to by the user device, that are not restricted for playback by the user device, or the like. In this way, some implementations described herein conserve network resources and/or processor and/or memory resources of user devices by reducing a number of situations where inapplicable information is provided to user devices.

FIGS. 1A-1H are diagrams of an overview of an example implementation 100 described herein. As shown in FIGS. 1A-1H, example implementation 100 can include a configuration management platform that can communicate with a client device operated by an operator and/or a user device used by a user.

As shown in FIG. 1A, and by reference number 110, the configuration management platform can receive, from a client device (e.g., which might have received an input from an operator), configuration information associated with onboarding a set of channels to be provided as part of an Internet protocol television (IPTV) service.

The operator might be configuring the set of channels such that content associated with the set of channels can be provided to user devices as part of an IPTV service. In other words, the configuration information might permit user devices to request content associated with the set of channels, and receive the content for playback. Additionally, the operator might be configuring the set of channels such that customized channel lineups can be provided to user devices. For example, the configuration management platform might compare configuration information, associated with a channel, and information associated with a user device to determine whether the user device is to receive information associated with the channel as part of a channel lineup (e.g., whether the customized channel lineup is to include the channel).

As shown in FIG. 1A, the configuration management platform can receive configuration information associated with a particular channel. While a particular channel is shown, it should be understood that the configuration management platform can receive configuration information associated with hundreds, thousands, etc. of channels. The channel identifier (e.g., 0473) can uniquely identify the channel. The description (e.g., CDE HD) can include a description of the channel that is to be provided, for display, by user devices. The device eligibility information can identify types of user devices (e.g., smartphones, set-top-boxes, and tablet computers) that are capable of receiving content associated with the channel and providing the content for playback. The service area (e.g., East Coast) can identify a set of geolocations to which the channel is applicable. For example, user devices, that include geolocations within the service area, can receive content associated with the channel. In example implementation 100, user devices on the East Coast would be capable of receiving content associated with the channel.

The connectivity information can identify types of access networks and/or types of access points (e.g., an Evolved Node B (eNB) and a customer premises equipment (CPE)) that are capable of being used to receive content associated with the channel. For example, the channel is capable of being received by user devices that are connected to base stations or CPE based on the configuration information shown in FIG. 1A. The resource identifier information can identify a resource identifier (e.g., CDN.com/CDEHD) that is capable of being used by user devices to retrieve and/or access content associated with the channel. The image information includes a logo that is capable of being provided, for display, by user devices in association with the IPTV service. Additional configuration information is described in more detail elsewhere herein.

Figure 1B:
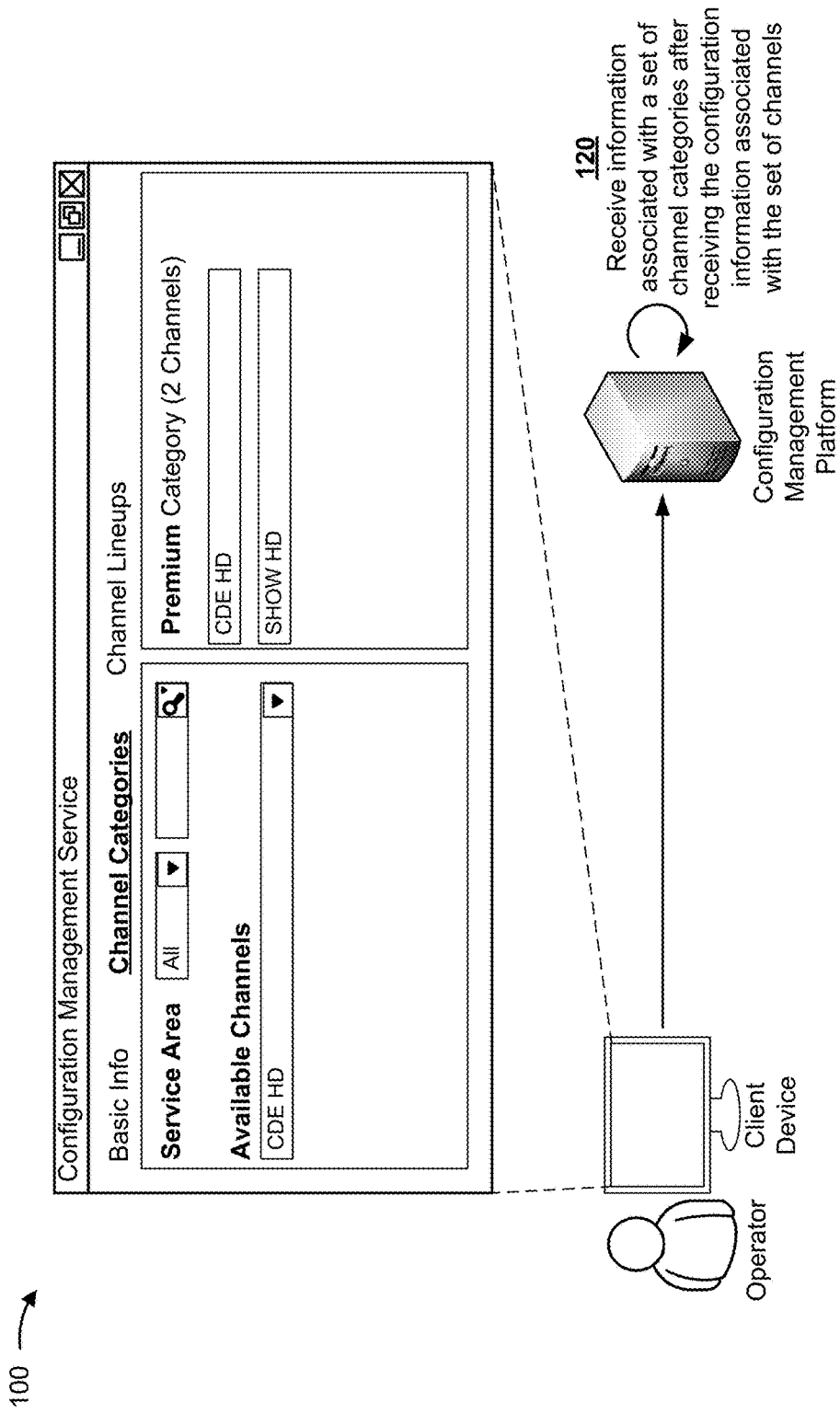

As shown in FIG. 1B, and by reference number 120, the configuration management platform can receive information associated with a set of channel categories after receiving the configuration information associated with the set of channels. For example, a channel category can include a set of channels. As shown, the operator can interact with the client device to select two channels (e.g., CDE HD and SHOW HD) to be added to a particular channel category (e.g., premium). While a particular category and particular channels are shown, it should be understood that, in practice, the operator might configure multiple categories.

Figure 1C:
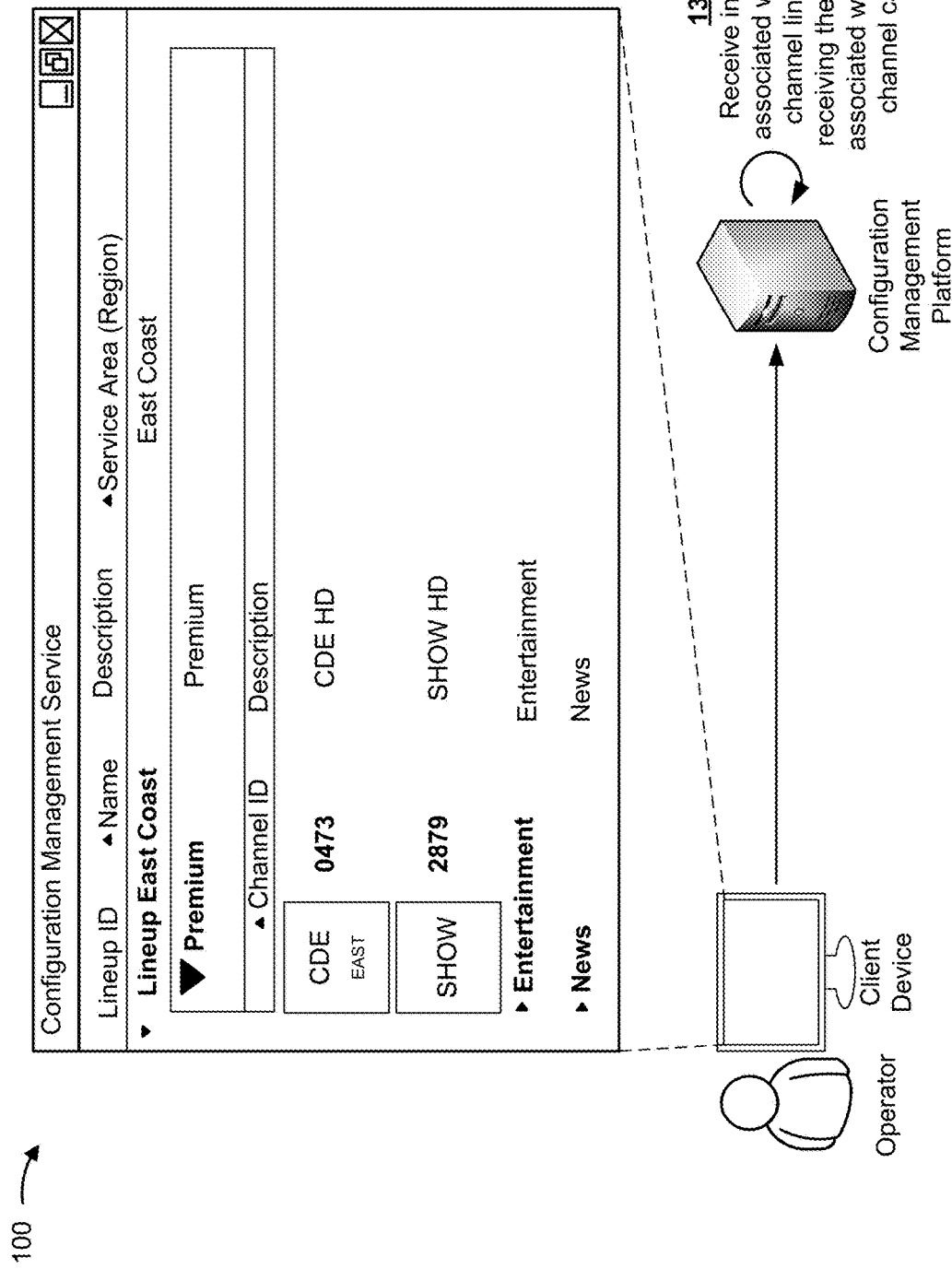

As shown in FIG. 1C, and by reference number 130, the configuration management platform can receive information associated with a set of channel lineups after receiving the information associated with the set of channel categories. For example, as shown, the operator can configure a particular channel lineup (e.g., Lineup East Coast) to include a set of channel categories (e.g., premium, entertainment, and news). The service area (e.g., East Coast) can identify a set of geolocations to which the channel lineup is applicable. In other words, user devices that are located within a particular region (e.g., the East Coast) might be eligible to receive the channel lineup.

In this way, the configuration management platform can provide channel lineups to user devices. Additionally, and as described elsewhere herein, the configuration management platform can provide a customized channel lineup based on configuration information, of channels of the channel lineup, and information associated a user device that is to receive the channel lineup.

Figure 1D:
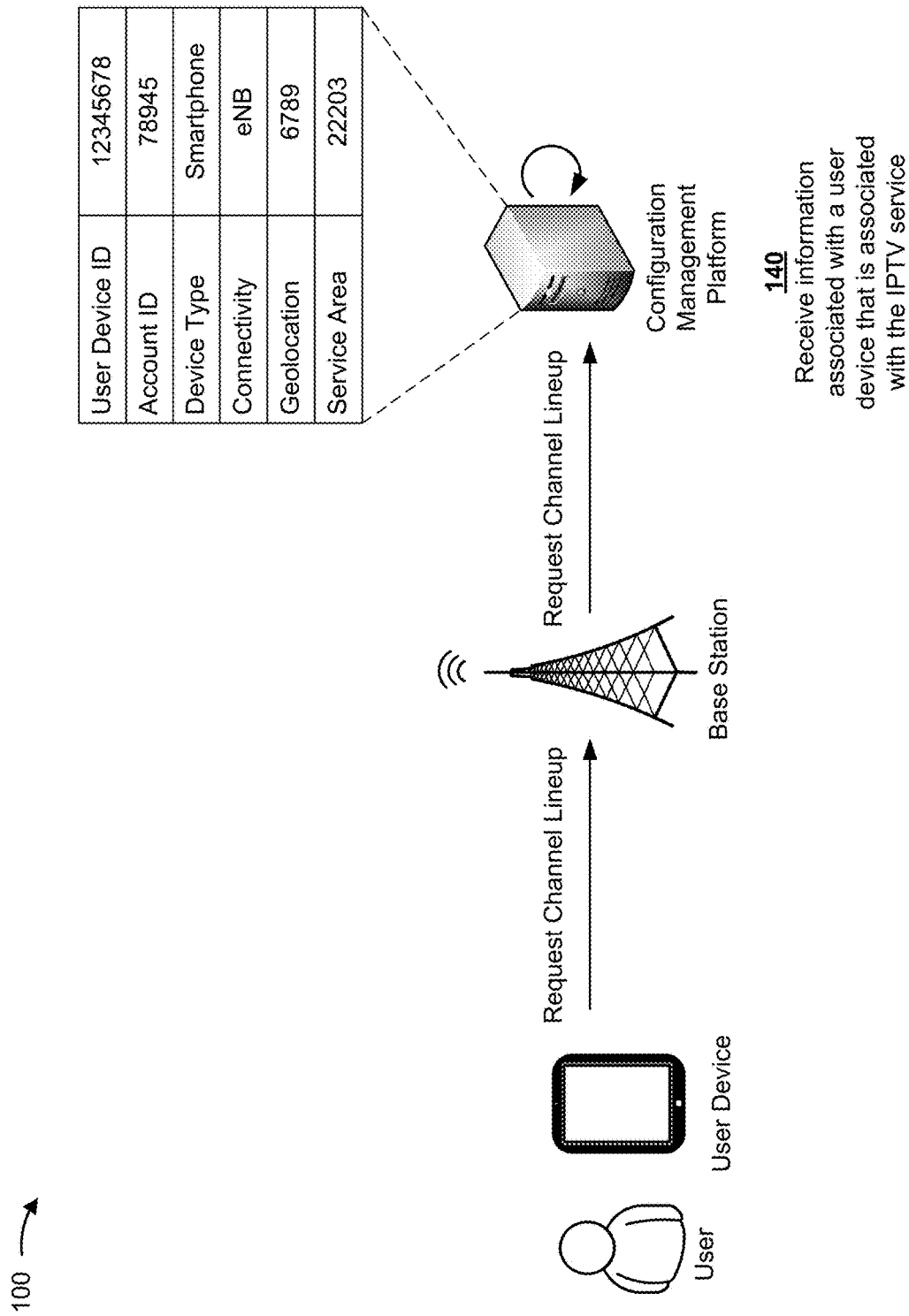

As shown in FIG. 1D, the configuration management platform can receive, from a user device (e.g., a smartphone) and via a base station, a request for a channel lineup. As further shown in FIG. 1D, and by reference number 140, the configuration management platform can receive information associated with the user device. The user device identifier (e.g., 12345678) can uniquely identify the user device. The account identifier (e.g., 78945) can identify an account associated with the user device. The device type (e.g., smartphone) can identify a device type of the user device. The connectivity identifier (e.g., eNB) can identify that the user device is connected to a base station. The geolocation identifier (e.g., 6789) can identify a geolocation of the user device. The service area identifier (e.g., 22203) can identify a service area (e.g., a zip code) associated with the user device.

While particular information associated with the user device is shown in FIG. 1D, it should be understood that other types of information can be received by the configuration management platform. Other information associated with the user device is described in more detail elsewhere herein.

Figure 1E:
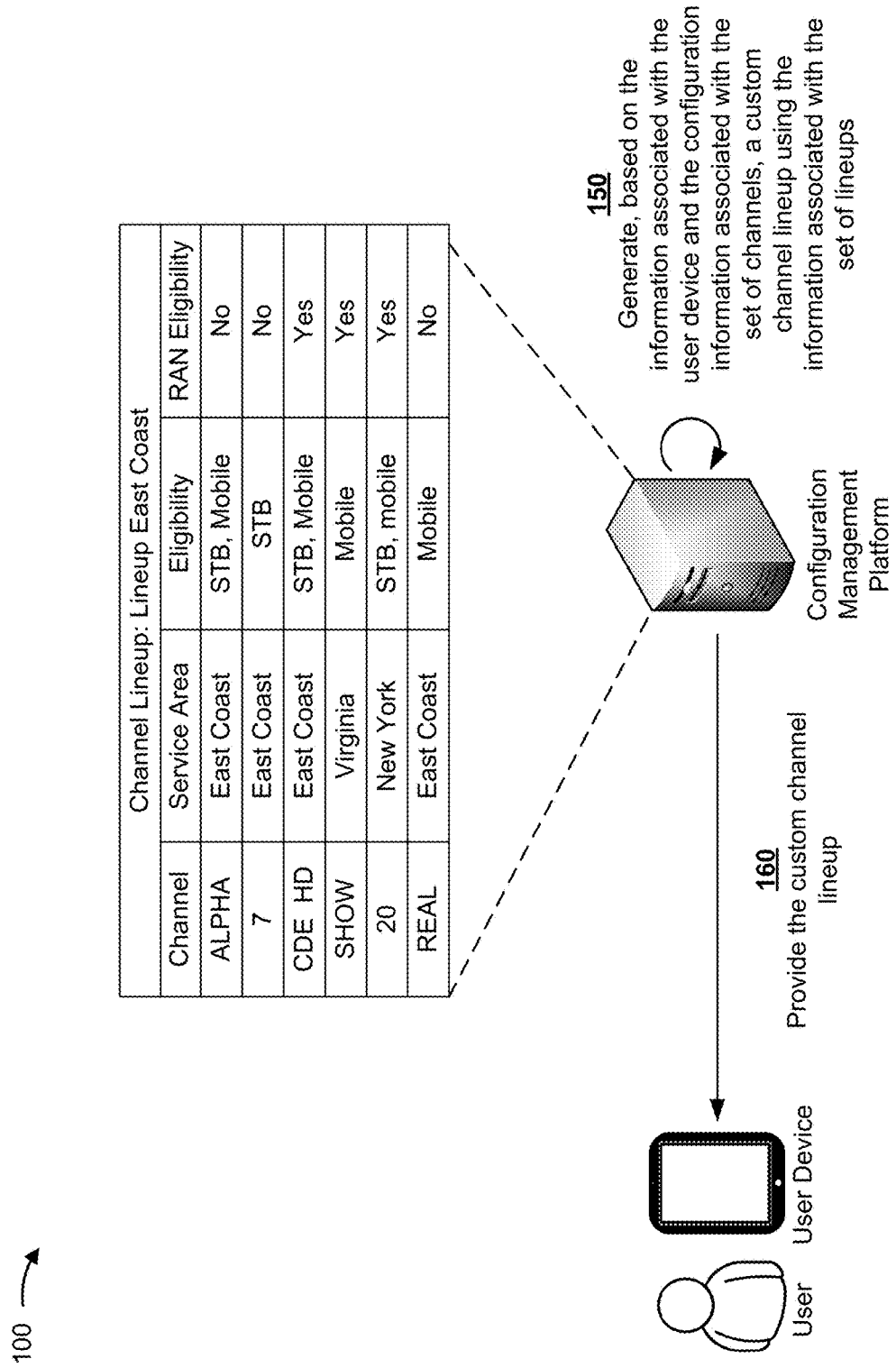

As shown in FIG. 1E, and by reference number 150, the configuration management platform can generate, based on the information associated with the user device and the configuration information associated with the set of channels, a customized channel lineup using the information associated with the set of lineups.

As shown, a channel lineup (e.g., Lineup East Coast) can include a set of channels (e.g., Alpha, 7, CDE HD, SHOW, 20, and REAL). Additionally, each of the channels can be associated with various configuration information that can be used to identify whether a user device is eligible to receive the channel (e.g., a service area, device eligibility, radio access network (RAN) eligibility, or the like).

As an example, the configuration management platform can determine that the user device is not eligible to receive channel ALPHA (e.g., because the user device is connected to a RAN), channel 7 (e.g., because the user device is connected to a RAN and because the user device is not a set-top box), channel 20 (e.g., because a service area of the user device is not within a service area of channel 20), or channel REAL (e.g., because the user device is connected to a RAN).

Additionally, the configuration management platform can determine that the user device is eligible to receive channels CDE HD and SHOW based on the configuration information. For example, both channels CDE HD and SHOW are capable of being received by user devices that are connected to RANs, are capable of being received by smartphones, and are capable of being received by user devices including geolocations associated with a particular region (e.g., Virginia and East Coast).

In this way, the configuration management platform can generate a customized channel lineup, using the channel lineup (e.g., Lineup East Coast), that includes particular channels (e.g., CDE HD and SHOW) that the user device is eligible to receive based on the configuration information and the information associated with the user device. As further shown in FIG. 1E, and by reference number 160, the configuration management platform can provide, to the user device, the customized channel lineup.

Figure 1F:
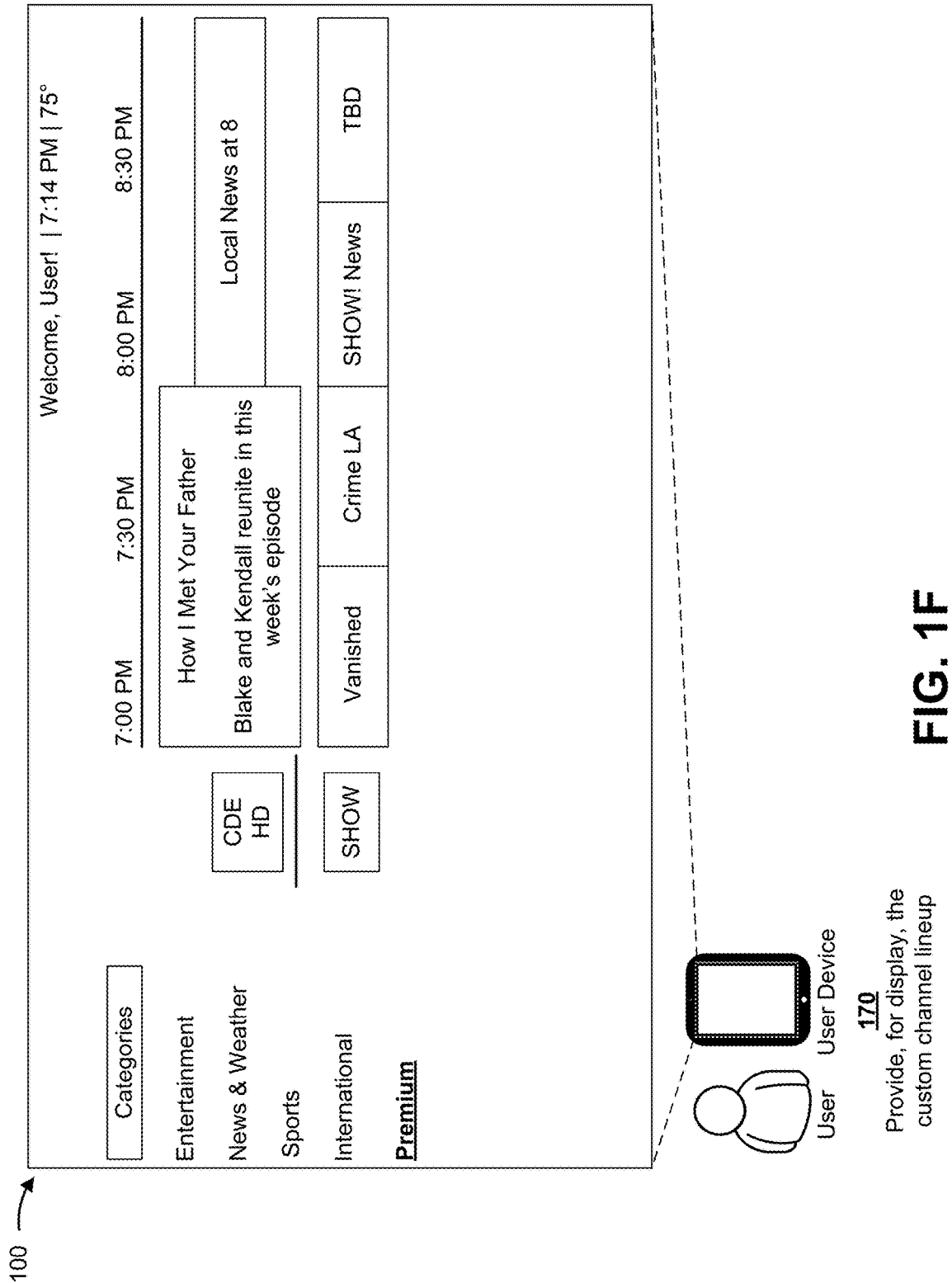

As shown in FIG. 1F, and by reference number 170, the user device can provide, for display, the customized channel lineup. For example, as shown, the user device can provide, for display via a user interface, the customized channel lineup in association with an IPTV application. The user device can provide, for display, information that permits a user to navigate the set of channel categories (e.g., Entertainment, News & Weather, Sports, International, and Premium) and perform an action based on selection of information being displayed (e.g., watch the particular channel, record the particular channel, cause the particular channel to be displayed on a different device, cause the particular channel to be recorded by a different device, and/or the like). Assume that a user selects a particular category (e.g., premium). In this case, the user device can provide, for display, a set of channels that are associated with the premium category. For example, the user device can provide, for display, a list of channels (e.g., CDE HD and SHOW) that are associated with the selected category and that are eligible to be received by the user device.

Figure 1G:
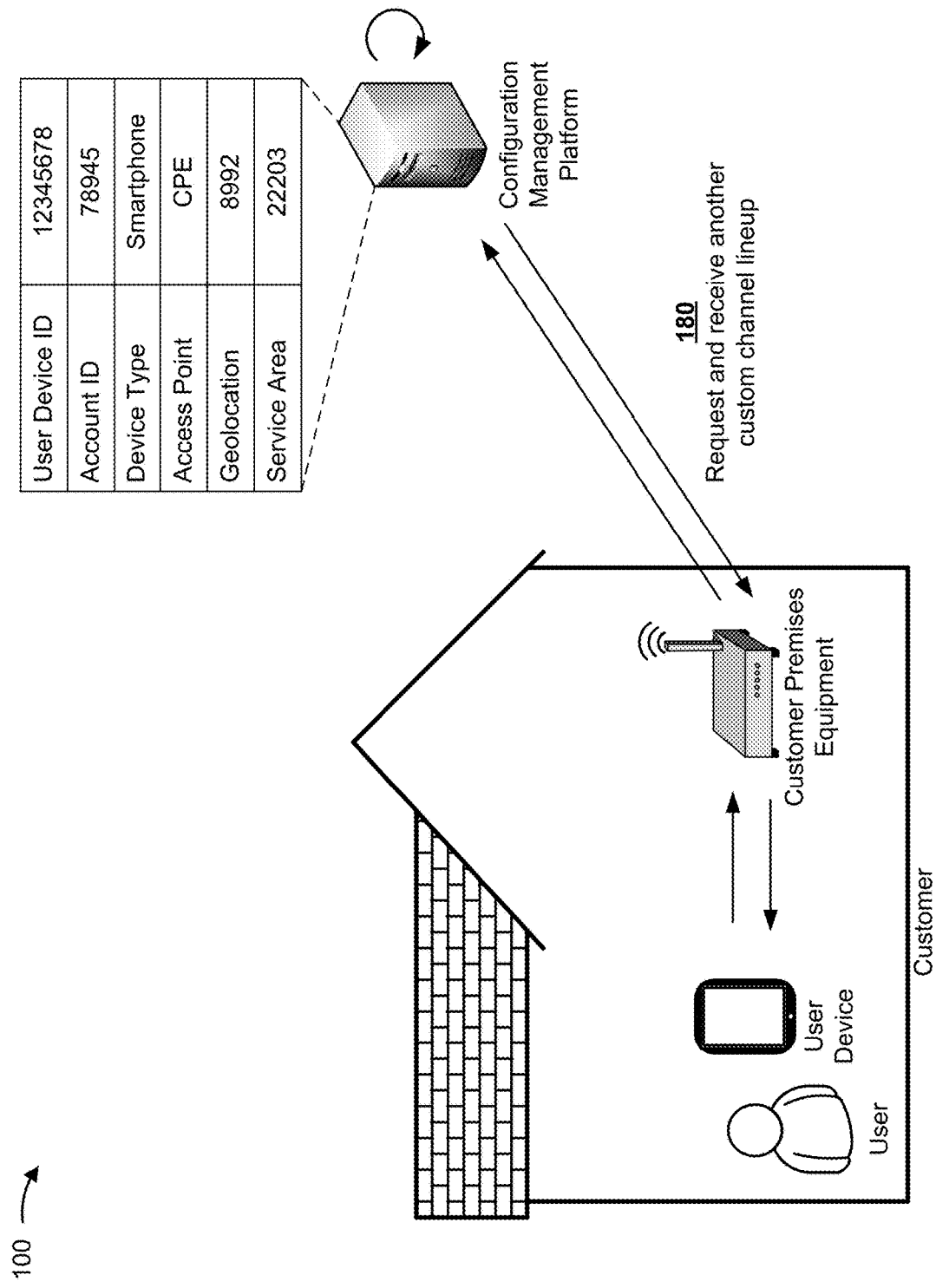

As shown in FIG. 1G, and by reference number 180, the user device can request and receive another customized channel lineup. For example, assume that the user device connects to a CPE associated with a customer premises (e.g., a home of the user) and/or switches from being connected to the base station to being connected to the CPE. In this case, the user device can provide, to the configuration management platform, a request for another customized channel lineup based on the change in access point connectivity.

As shown, the configuration management platform can determine that the user device is connected to a CPE and/or that the user device is not connected to a base station associated with a RAN. In this case, and referring back to FIG. 1E, the configuration management platform can determine that other channels of the channel lineup (e.g., Lineup East Coast) are eligible to be received by the user device. For example, the configuration management platform can determine that channels, that were previously ineligible to be received by the user device based on RAN connectivity, are now eligible to be received by the user device. The configuration management platform can provide, to the user device, another customized channel lineup that includes the other channels (e.g., channel ALPHA and channel REAL).

Figure 1H:
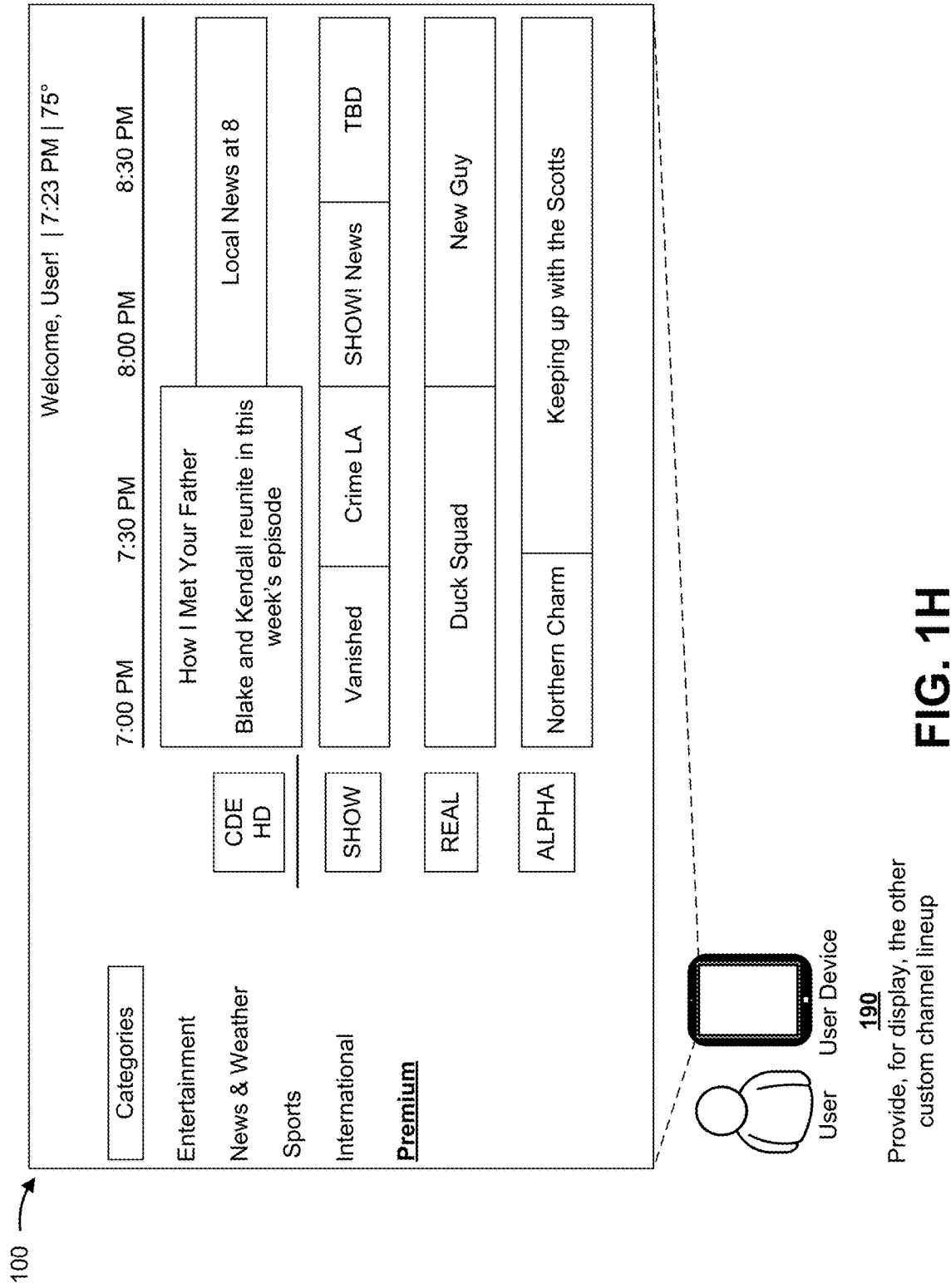

As shown in FIG. 1H, and by reference number 190, the user device can provide, for display, the other customized channel lineup. For example, as shown, the user device can provide, for display via the user interface, information associated with channel REAL and channel ALPHA as part of the premium category of channels.

In this way, some implementations described herein provide a configuration management platform that can provide a customized channel lineup based on information that can be specific to a particular user device. Thereby, some implementations described herein conserve network resources and/or conserve processor and/or memory resources of user devices by reducing an amount of information, that is provided to user devices, that is associated with content that is ineligible to be received by the user devices, is incapable of being provided for playback, is inapplicable to the user device, or the like.

Additionally, some implementations described herein conserve processor and/or memory resources of configuration management devices by reducing an amount of configuration and an amount of time associated with channel onboarding. In other words, an operator can configure a channel with particular configuration information, assign the channel to a channel category, and assign the channel category to a channel lineup. The operator can then configure the channel category and/or channel lineup to be used in association with multiple IPTV services. Additionally, changes to configuration information associated with a particular channel can be propagated to channel categories and/or channel lineups that include the particular channel (e.g., instead of requiring individual modifications to the channel categories and/or channel lineups).

As indicated above, FIGS. 1A-1H are provided merely as an example. Other examples are possible and can differ from what was described with regard to FIGS. 1A-1H.

Figure 2:
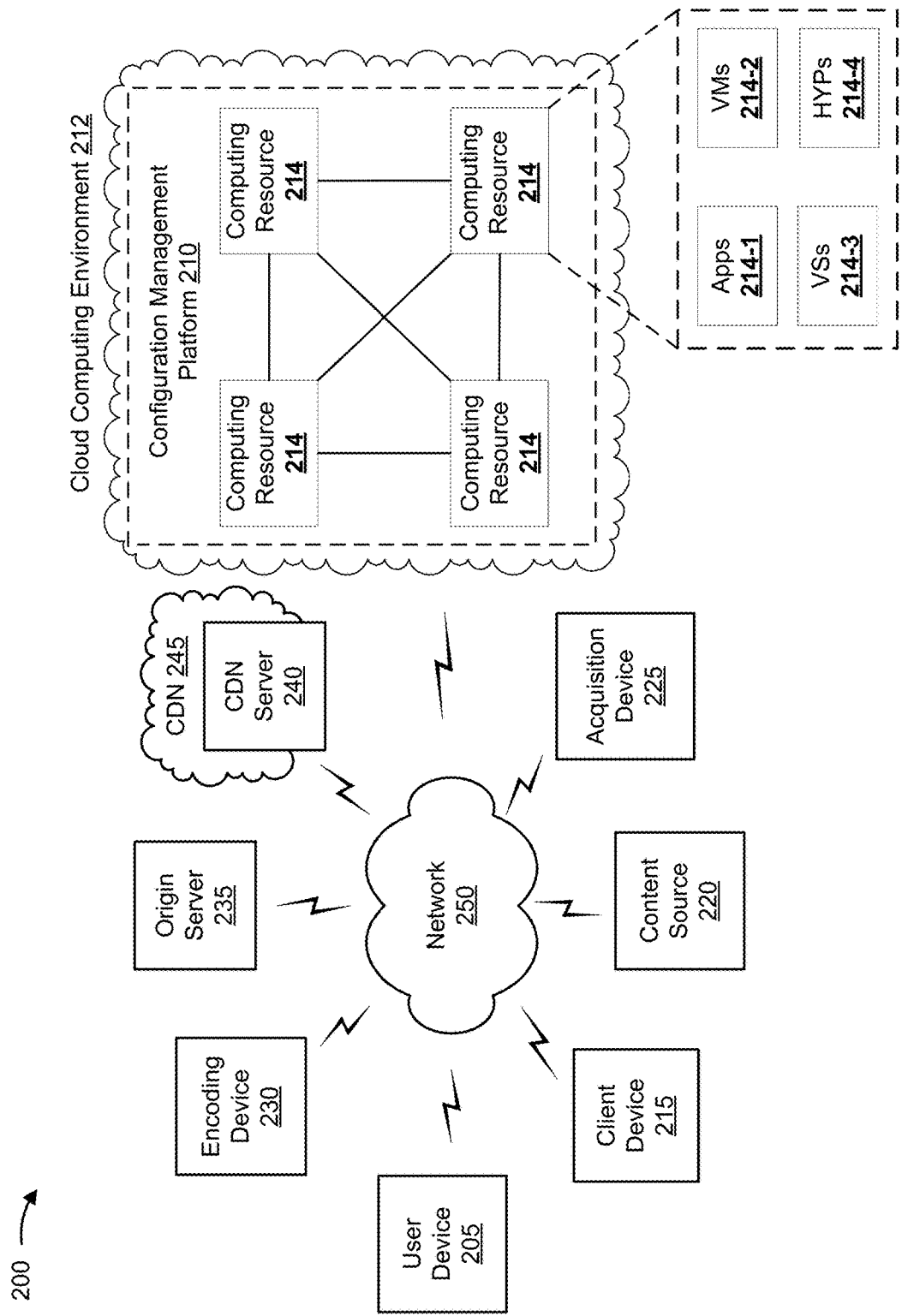
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205, a configuration management platform 210, a client device 215, a content source 220, an acquisition device 225, an encoding device 230, an origin server 235, a CDN server 240, a CDN 245, and a network 250. Devices of environment 200 can interconnect via wired connections, wireless connections, or a combination of wired and wireless connections.

User device 205 includes one or more devices capable of receiving, generating, storing, processing, and/or providing information associated with an IPTV service. For example, user device 205 can include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device.

Configuration management platform 210 includes one or more devices capable of providing configuration management as a service (e.g., CMaaS). In some implementations, configuration management platform 210 can be designed to be modular such that certain software components can be swapped in or out depending on a particular need. As such, configuration management platform 210 can be easily and/or quickly reconfigured for different uses.

In some implementations, as shown, configuration management platform 210 can be hosted in cloud computing environment 212. Notably, while implementations described herein describe configuration management platform 210 as being hosted in cloud computing environment 212, in some implementations, configuration management platform 210 might not be cloud-based (i.e., can be implemented outside of a cloud computing environment) or can be partially cloud-based.

Cloud computing environment 212 includes an environment that hosts configuration management platform 210.

Cloud computing environment 212 can provide computation, software, data access, storage, etc. services that do not require end-user (e.g., client device 215) knowledge of a physical location and configuration of system(s) and/or device(s) that hosts configuration management platform 210. As shown, cloud computing environment 212 can include a group of computing resources 214 (referred to collectively as "computing resources 214" and individually as "computing resource 214").

Computing resource 214 includes one or more personal computers, workstation computers, server devices, or other types of computation and/or communication devices. In some implementations, computing resource 214 can host configuration management platform 210. The cloud resources can include compute instances executing in computing resource 214, storage devices provided in computing resource 214, data transfer devices provided by computing resource 214, etc. In some implementations, computing resource 214 can communicate with other computing resources 214 via wired connections, wireless connections, or a combination of wired and wireless connections.

As further shown in FIG. 2, computing resource 214 includes a group of cloud resources, such as one or more applications ("APPs") 214-1, one or more virtual machines ("VMs") 214-2, virtualized storage ("VSs") 214-3, one or more hypervisors ("HYPs") 214-4, or the like.

Application 214-1 includes one or more software applications that can be provided to or accessed by client device 215. Application 214-1 can eliminate a need to install and execute the software applications on client device 215. For example, application 214-1 can include software associated with configuration management platform 210 and/or any other software capable of being provided via cloud computing environment 212. In some implementations, one application 214-1 can send/receive information to/from one or more other applications 214-1, via virtual machine 214-2.

Virtual machine 214-2 includes a software implementation of a machine (e.g., a computer) that executes programs like a physical machine. Virtual machine 214-2 can be either a system virtual machine or a process virtual machine, depending upon use and degree of correspondence to any real machine by virtual machine 214-2. A system virtual machine can provide a complete system platform that supports execution of a complete operating system ("OS"). A process virtual machine can execute a single program, and can support a single process. In some implementations, virtual machine 214-2 can execute on behalf of a user (e.g., client device 215), and can manage infrastructure of cloud computing environment 212, such as data management, synchronization, or long-duration data transfers.

Virtualized storage 214-3 includes one or more storage systems and/or one or more devices that use virtualization techniques within the storage systems or devices of computing resource 214. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 214-4 can provide hardware virtualization techniques that allow multiple operating systems (e.g., "guest operating systems") to execute concurrently on a host computer, such as computing resource 214. Hypervisor 214-4 can present a virtual operating platform to the guest operating systems, and can manage the execution of the guest operating systems. Multiple instances of a variety of operating systems can share virtualized hardware resources.

Client device 215 includes one or more devices capable of receiving, generating, storing, processing, and/or providing information associated with a configuration management service. For example, client device 215 can include a device, such as a mobile phone (e.g., a smart phone, a radiotelephone, etc.), a laptop computer, a tablet computer, a handheld computer, or a similar type of device.

Content source 220 includes one or more devices capable of receiving, storing, processing, and/or providing information associated with streaming media content. For example, content source 220 can include a server device or a similar device. In some implementations, content source 220 can provide a stream (e.g., a signal stream) to acquisition device 225.

Acquisition device 225 includes one or more devices capable of receiving, storing, processing, and/or providing information associated with streaming media content. For example, acquisition device 225 can include a server device or a similar device. In some implementations, acquisition device 225 can receive a stream from content source 220, and can provide the stream to encoding device 230.

Encoding device 230 includes one or more devices capable of receiving, storing, processing, and/or providing information associated with streaming media content. For example, encoding device 230 can include a server device or a similar device. In some implementations, encoding device 230 can encode a stream, can partition the stream into segments, and can provide streaming media content (e.g., files associated with the segments of the streaming media content) to origin server 235.

Origin Server 235 includes one or more devices capable of receiving, storing, processing, and/or providing streaming media content (e.g., one or more segments of streaming media content). For example, origin server 235 can include a storage device, a server, or a similar device. In some implementations, origin server 235 can store streaming media content, and/or can provide the streaming media content to CDN servers 240 (e.g., for distribution to user devices 205).

CDN server 240 includes one or more devices capable of receiving, storing, processing, and/or providing information associated with streaming media content. For example, CDN server 240 can include a server device or a similar device. In some implementations, CDN server 240 can receive streaming media content from origin server 235, can store the streaming media content, and can provide the streaming media content to user device 205.

CDN 245 includes one or more wired and/or wireless networks of devices that are capable of receiving, storing, processing, and/or providing streaming media content (e.g., one or more segments of the streaming media content). CDN 245 can include, for example, servers, data centers, or the like.

Network 250 includes one or more wired and/or wireless networks. For example, network 250 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
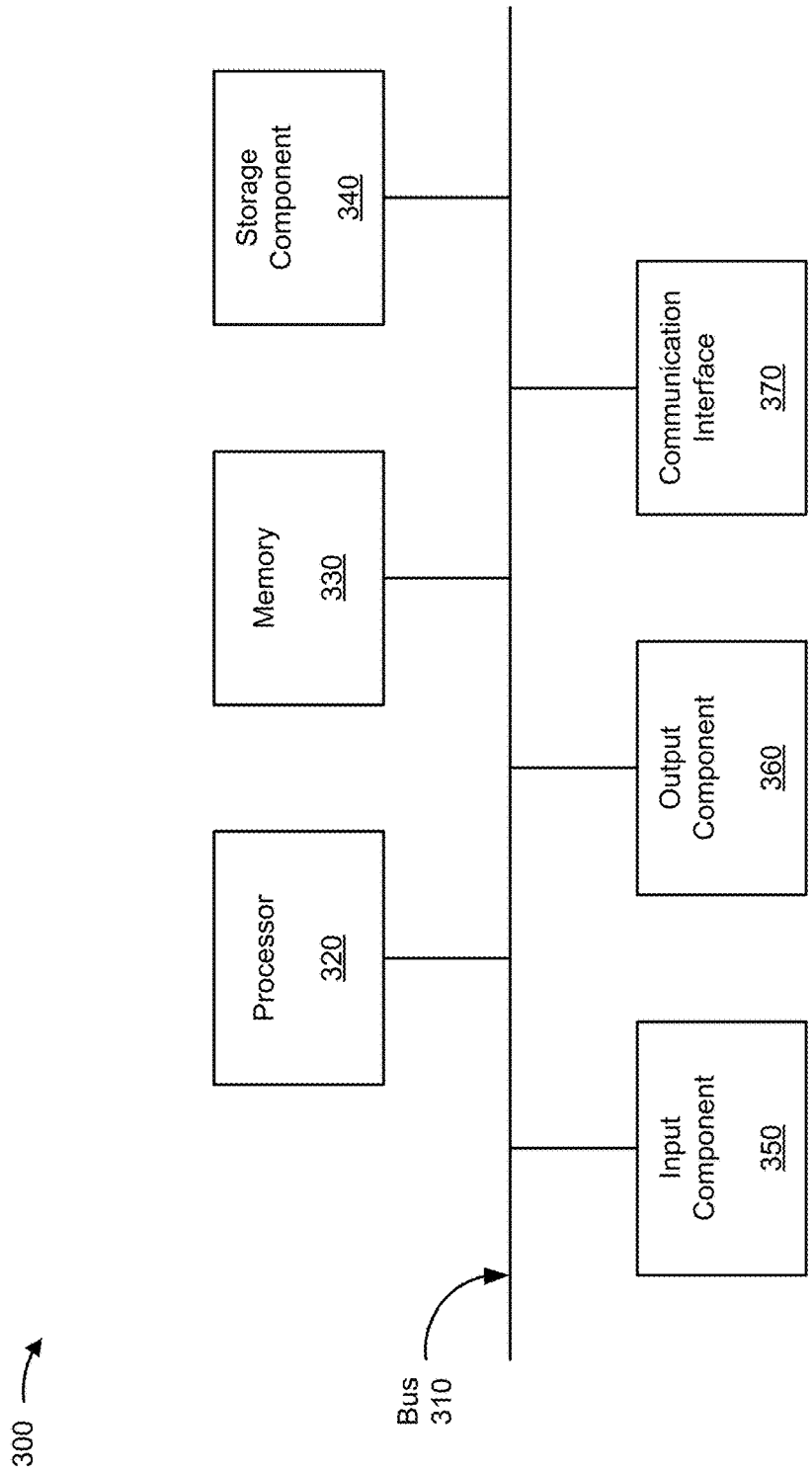
FIG. 3 is a diagram of example components of one or more devices of FIG. 2.

FIG. 3 is a diagram of example components of a device 300. Device 300 can correspond to user device 205, configuration management platform 210, client device 215, content source 220, acquisition device 225, encoding device 230, origin server 235, and/or CDN server 240. In some implementations, user device 205, configuration management platform 210, client device 215, content source 220, acquisition device 225, encoding device 230, origin server 235, and/or CDN server 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
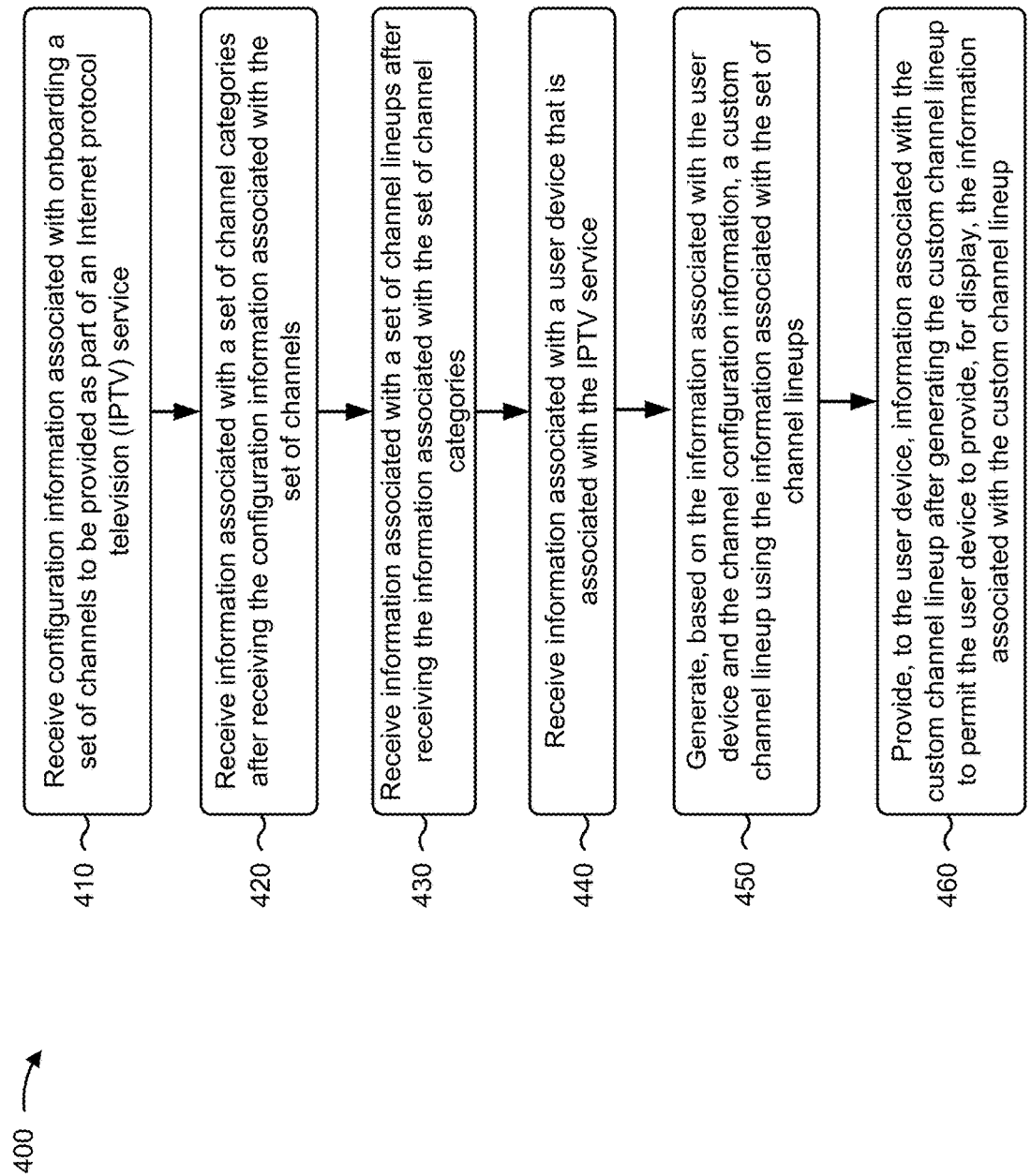
FIG. 4 is a flow chart of an example process for content onboarding and custom channel lineup provisioning.

FIG. 4 is a flow chart of an example process 400 for content onboarding and customized channel lineup provisioning. In some implementations, one or more process blocks of FIG. 4 can be performed by configuration management platform 210. In some implementations, one or more process blocks of FIG. 4 can be performed by another device or a group of devices separate from or including configuration management platform 210, such as user device 205, client device 215, content source 220, acquisition device 225, encoding device 230, origin server 235, and/or CDN server 240.

As shown in FIG. 4, process 400 can include receiving configuration information associated with onboarding a set of channels to be provided as part of an Internet protocol television (IPTV) service (block 410). For example, configuration management platform 210 can receive, from client device 215, configuration information associated with onboarding a set of channels to be provided as part of an IPTV service, a set of IPTV services, or the like. As used herein, onboarding can refer to a process of configuring a set of channels to be provided in association with an IPTV service.

In some implementations, an operator (e.g., a content management operator) can interact with client device 215 to configure a set of channels with particular configuration information as part of a channel onboarding process. In other words, the operator can interact with client device 215 to configure the set of channels to permit the set of channels to be provided as part of the IPTV service. In some implementations, configuration management platform 210 can provide configuration management as a service (CMaaS), and permit client device 215 to provide configuration information associated with a set of channels.

In some implementations, a channel can be associated with various configuration information. In some implementations, configuration information can include a set of identifiers of the channel. For example, a channel can be associated with a channel identifier that uniquely identifies the channel. Additionally, or alternatively, a channel can be associated with a call sign identifier, such as set of characters that identify the channel. Additionally, or alternatively, a channel be associated with a descriptive name identifier, such as a designation of the channel that can be provided, for display, by user devices 205.

In some implementations, configuration information can include logo information. For example, logo information can be associated with a logo of the channel, a logo of an entity associated with the channel, an image, an icon, or the like. In some implementations, user device 205 can provide, for display, logo information associated with the channel to identify the channel in association with a menu, guide, catalog, etc.

In some implementations, configuration information can include a service identifier that identifies a particular service associated with the channel. For example, a service identifier can identify an IPTV service, a streaming media service, a content service, or the like. In some implementations, a service identifier can identify a particular service for which the channel is to be onboarded. In this way, an operator of client device 215 can select multiple services, and onboard the channel for usage in association with the multiple services. Thereby, some implementations described herein reduce an amount of time and an amount of configuration associated with onboarding channels as part of services. In other words, instead of configuring a channel ten separate times for ten different services, an operator can configure a channel once for usage in association with the ten different services. Thereby, some implementations described herein conserve network resources and processor and/or memory resources of devices associated with channel onboarding.

In some implementations, configuration information can include a resolution associated with the channel. For example, a resolution can refer to standard definition (SD), high definition (HD), ultra-high definition (UHD), or the like. In some implementations, user device 205 can provide, for display, information that identifies a resolution associated with a channel based on the configuration information. Additionally, or alternatively, and as described elsewhere herein, configuration management platform 210 can identify whether user device 205 is capable of supporting a resolution of the channel when generating the customized channel lineup.

In some implementations, configuration information can include a type of the channel. For example, a type of the channel can refer to a linear channel, a video on demand (VOD) channel, an interactive VOD (IVOD) channel, a true VOD (TVOD) channel, a near VOD (NVOD) channel, a quasi VOD (QVOD) channel, a live channel, a public, educational, and government access (PEG) channel, a premium channel, a pay-per-view (PPV) channel, a sports channel, or the like.

In some implementations, configuration information can include a service area identifier associated with the channel. For example, a service area identifier can include a region identifier, a local franchising authority (LFA) identifier, a zip code identifier, a county identifier, a metropolitan statistical area (MSA) identifier, a core based statistical area (CBSA) identifier, a common language location identifier (CLLI), or the like. In some implementations, a service area identifier can identify a particular service area (e.g., a set of geolocations) to which the channel is applicable. In other words, user devices 205 that are located within the service area might be eligible to receive the channel, whereas other user devices 205 that are not located within the service area will not be eligible to receive the channel.

In some implementations, configuration information can include flags associated with a channel. For example, a flag can identify whether the channel is Emergency Alert System (EAS) exempt. Additionally, or alternatively, a flag can identify whether the channel includes age restricted content. Additionally, or alternatively, a flag can identify whether the channel is on-demand. Additionally, or alternatively, a flag can identify whether the channel supports dynamic ad insertion (DAI). Additionally, or alternatively, a flag can identify whether a channel is recordable. Additionally, or alternatively, a flag can identify whether a channel is eligible to be received "in-home," "out-of-home," or both, as described elsewhere herein. Additionally, or alternatively, a flag can identify a number of user devices 205, associated with a particular account, that can use the IPTV service (e.g., receive content concurrently, use the IPTV service concurrently, or the like).

In some implementations, configuration information can include content key information. For example, content key information can identify an encryption key, a credential, a token, or the like, that can be used by user device 205 when requesting content associated with the channel.

In some implementations, configuration information can include a scope associated with the channel. For example, a scope can identify whether the channel is associated with a testing phase, a staging phase, a production phase, or the like. In some implementations, configuration management platform 210 might provide, to user devices 205, channel lineups that include channels that are associated with a production phase.

In some implementations, configuration information can include a resource identifier. For example, a resource identifier can include a uniform resource location (URL), a uniform resource identifier (URI), or the like. For example, user device 205 can use the resource identifier to receive, from CDN server 240 or origin server 235, IPTV content associated with the channel.

In some implementations, configuration information can include device eligibility information. For example, device eligibility information can identify whether particular types of user devices 205 (e.g., set-top boxes, mobile phones, tablet computers, desktop computers, or the like) are eligible to receive IPTV content associated with the channel, and provide the IPTV content for playback. In some implementations, an operator can interact with client device 215 to select particular types of user devices 205 that are eligible to receive the channel. In this way, particular channels can be targeted to particular device types that are capable of providing the content for playback, for which the content was designed for playback, etc.

In some implementations, the configuration information can include connectivity information. For example, connectivity information can identify whether a user device 205 is eligible to receive IPTV content associated with the channel, and provide the IPTV content for playback based on an access point connectivity and/or access network connectivity of the user device 205. As an example, "in-home" eligibility can identify that a user device 205 that is connected to a customer premises equipment (CPE) is eligible to receive and provide IPTV content for playback. As another example, "out-of-home" eligibility can identify that a user device that is connected to a radio access network (RAN), a public access network (e.g., a public Wi-Fi network, or the like), an access network that is not associated with a customer premises, or the like, is eligible to receive and provide the content for playback.

In some implementations, the configuration information can include demographic information. For example, demographic information can identify a particular demographic for which the channel is to be targeted. Additionally, or alternatively, the configuration information can include behavioral information. For example, behavioral information can identify that a channel is to be targeted to particular user devices that are associated with a particular content playback history, a particular browsing history, or the like.

In some implementations, the configuration information can refer to subscription information. For example, subscription information can identify whether a channel requires a particular subscription, whether the channel is part of a channel category or package that requires a subscription, or the like.

In practice, configuration management platform 210 can receive configuration information associated with hundreds, thousands, etc. of channels. Additionally, or alternatively, an operator can interact with client device 215 to configure and re-configure the set of channels with particular configuration information. In this way, the set of channels can be onboarded as part of an IPTV service, and can be added to a channel category, as described below.

As further shown in FIG. 4, process 400 can include receiving information associated with a set of channel categories after receiving the configuration information associated with the set of channels (block 420). For example, configuration management platform 210 can receive, from client device 215, information associated with a set of channel categories after receiving the configuration information associated with the set of channels. In some implementations, a channel category can refer to a set of channels. In some implementations, a channel category can include a set of channels that share a common characteristic, a theme, or the like. As a particular example, a set of sports channels can be associated with a "sports" channel category.

In some implementations, and as described elsewhere herein, a channel lineup can include a set of channel categories. In other words, a channel lineup can include a set of channel categories, and the set of channel categories can include respective sets of channels. In some implementations, a user device 205 can provide, for display, a channel lineup that includes a set of channel categories (e.g., in association with a menu, a guide, a catalog, or the like). Continuing with the example, channels of a channel category can be provided for display in proximity, in association with a particular menu, or the like.

In some implementations, configuration management platform 210 can receive information associated with an identifier of a channel category. For example, a channel category identifier can uniquely identify a channel category. Additionally, or alternatively, a channel category description can include a description of the channel category that is provided, for display, by user devices 205. For example, configuration management platform 210 can receive information associated with channel category descriptions, such as "sports," "comedy," "history," "local," "premium," "news," "entertainment," "politics," "business," "finance," "drama," etc.

In some implementations, configuration management platform 210 can receive information that identifies a set of channels that are associated with the channel category. For example, an operator can interact with client device 215 to select particular channels to be added to the channel category. In some implementations, configuration management platform 210 can receive information that identifies a set of channels (e.g., respective channel identifiers), and associate the channel identifiers and the channel category identifier.

In this way, and as described elsewhere herein, configuration management platform 210 can receive information that associates a channel category and a channel lineup, and can associate a set of channels and the channel lineup based on the channel identifiers that were associated with the channel category identifier. In this way, an amount of time and an amount of configuration associated with channel onboarding is reduced, thereby conserving processor and/or memory resources of devices associated with channel onboarding.

In some implementations, configuration management platform 210 can receive information that identifies a set of services that are capable of using the channel category. For example, configuration management platform 210 can receive information associated with respective service identifiers. As an example, configuration management platform 210 can receive information that identifies that a first IPTV service, a second IPTV service, and a streaming media service are eligible to use the channel category. In this way, an operator can configure a channel category in association with a first service, and then select the channel category to be used in association with a second service (e.g., without having to re-configure the channel category for use in association with the second service).

In this way, some implementations described herein conserve processor and/or memory resources of client devices 215 and/or configuration management platform 210 by reducing an amount of configuration and an amount of time associated with configuring channel categories and/or content onboarding.

Additionally, in some cases, an operator can re-configure, modify, etc. a channel of a particular channel category, and a set of services, that include the channel category, can receive updated configuration information. In this way, some implementations herein reduce an amount of time and an amount of configuration associated with channel onboarding, and conserve processor and/or memory resources of client devices 215 and configuration management platform 210. In practice, configuration management platform 210 can receive hundreds, thousands, etc. of channel categories, and can add a set of channel categories to a channel lineup, as described below.

As further shown in FIG. 4, process 400 can include receiving information associated with a set of channel lineups after receiving the information associated with the set of channel categories (block 430). For example, configuration management platform 210 can receive, from client device 215, information associated with a set of channel lineups after receiving the information associated with the set of channel categories. In some implementations, an operator can interact with client device 215 to generate a channel lineup.

In some implementations, a channel lineup can refer to information associated with a set of channels, information associated with a set of channel categories, information that permits content associated with the set of channels to be retrieved, information that permits guide data associated with the set of channels to be retrieved, information that permits other types of metadata associated with the set of channels to be retrieved, or the like.

In other words, user device 205 can provide, for display, information associated with a channel lineup to permit a user to view and/or interact with a set of channel categories and/or sets of channels that are associated with the channel lineup. Put another way, a channel lineup can refer to a list of channels that is capable of being provided for display by user device 205.

In some implementations, configuration management platform 210 can receive, from client device 215, information associated with a channel lineup identifier of the channel lineup. In some implementations, configuration management platform 210 can receive information associated with a service area of the channel lineup. In other words, configuration management platform 210 can receive information that identifies a service area to which the channel lineup is applicable.

In some implementations, and as described elsewhere herein, a channel lineup can include information associated with a service area identifier (e.g., a region identifier), and various channels of the channel lineup can include information associated with different types of service area identifiers (e.g., zip code identifiers, LFA identifiers, or the like). As such, configuration management platform 210 can dynamically generate a customized channel lineup to provide to user device 205 based on configuration information associated with the set of channels and information associated with user device 205, as described elsewhere herein.

In some implementations, configuration management platform 210 can receive information with a set of channel lineups. In some implementations, different channel lineups, of the set of channel lineups, can include a same channel category. Additionally, an operator can configure and/or re-configure a single channel category, and the configuration and/or re-configuration can be propagated to other channel lineups that include the channel category. Further still, an operator can configure and/or re-configure a particular channel, and the configuration and/or re-configuration can be propagated to channel categories and/or channel lineups that include the particular channel. In this way, some implementations described herein reduce an amount of configuration and an amount of time associated with configuration of channel lineups, thereby conserving processor and/or memory resources of configuration management platform 210 and client devices 215.

In some implementations, configuration management platform 210 can receive information associated with a set of channel lineups, and provide a custom channel lineup to a user device, as described elsewhere herein.

As further shown in FIG. 4, process 400 can include receiving information associated with a user device that is associated with the IPTV service (block 440). For example, configuration management platform 210 can receive, from user device 205, information associated with user device 205 that permits configuration management platform 210 to generate a customized channel lineup.

In some implementations, a custom channel lineup can refer to a channel lineup that is determined based on information associated with a particular user device 205. In other words, different user devices 205 can receive different channel lineups based on particular information of the user devices 205, as described elsewhere herein.

In some implementations, user device 205 can provide, to configuration management platform 210, a request for a channel lineup. For example, user device 205 can provide, to configuration management platform 210, a request for a channel lineup based on a time frame (e.g., periodically), based on an event (e.g., a change in geolocation of user device 205, a change in access point or access network connectivity of user device 205, or the like), based on a user interaction with user device 205, based on a log-in process, or the like.

In some implementations, configuration management platform 210 can receive information associated with user device 205. For example, user device 205 can provide the information associated with user device 205 based on the request for the channel lineup. Additionally, or alternatively, configuration management platform 210 can identify a memory location at which the information associated with user device 205 is stored, and retrieve the information associated with user device 205. Additionally, or alternatively, configuration management platform 210 can provide, to user device 205, a request for the information associated with user device 205, and receive the information based on the request. In some implementations, a user of user device 205 can configure settings associated with an IPTV service, and configuration management platform 210 can receive the information associated with user device 205 based on the configured settings.

In some implementations, the information associated with user device 205 can be associated with an account of user device 205. Additionally, or alternatively, the information associated with user device 205 can be associated with a set of profiles of user device 205 (e.g., associated with the account). For example, multiple users might be associated with a particular user device 205 (e.g., registered to use user device 205), and the multiple users might be associated with respective profiles. In this way, user device 205 might receive different channel lineups based on a particular profile that is being used in association with user device 205.

In some implementations, the information associated with user device 205 can be associated with user information. For example, the user information can identify demographic information of a user, a set of interests of a user, or the like.

In some implementations, the information associated with user device 205 can be associated with behavioral information. For example, behavioral information can identify a content playback history of user device 205 (e.g., most viewed content, most frequently viewed content, least viewed content, favorited content, most recorded content, etc.). Additionally, or alternatively, behavioral information can identify a browsing history of user device 205. Additionally, or alternatively, behavioral information can identify activity patterns associated with user device 205 (e.g., times of day at which user device 205 provides content for playback, times of day at which a particular user is logged in, times of day at which user device 205 is associated with a particular geolocation, times of day at which user devices 205 is connected to a particular access network, or the like).

In some implementations, the information associated with user device 205 can include subscription information associated with an account of user device 205. For example, the subscription information can identify channels to which user device 205 is subscribed, content to which user device 205 is subscribed, services to which user device 205 is subscribed, channel categories to which user device 205 is subscribed, etc.

In some implementations, the information associated with user device 205 can include restriction information. For example, restriction information can include a rating restriction (e.g., parental guidance (PG) only, PG-13 and below, etc.), an age restriction, a content type restriction, a channel restriction, a channel category restriction, a time of day restriction, a device type restriction, an access point and/or access network restriction, a geolocation restriction, or the like. Additionally, or alternatively, restriction information can include content restriction, such as a restriction regarding a particular movie, show, actress, actor, content source, event, theme, or the like.

In some implementations, the information associated with user device 205 can identify device information of user device 205. For example, the device information can identify a device type (e.g., a set-top box, a mobile phone, a tablet computer, etc.). Additionally, or alternatively, the device information can identify an operating system version, a software version, a user interface version, a screen parameter, or the like.

In some implementations, the information associated with user device 205 can include location information. For example, location information can identify a geolocation of user device 205, a service area identifier of user device 205, a geolocation of a customer premises associated with user device 205, or the like.

In some implementations, the information associated with user device 205 can include connectivity information. For example, connectivity information can identify an access point connectivity of user device 205, an access network connectivity of user device 205, or the like (e.g., whether user device 205 is connected to a customer premises equipment, whether user device 205 is connected to a radio access network, whether user device 205 is connected to a public access network, or the like).

In some implementations, the information associated with user device 205 can identify a time frame. For example, a time frame can refer to a time of day, a day of the week, a month, a season, or the like.

In this way, configuration management platform 210 can receive information associated with user device 205, and generate a customized channel lineup to provide to user device 205 based on the particular information associated with user device 205 and configuration information associated with channels of a channel lineup, as described below.

As further shown in FIG. 4, process 400 can include generating, based on the information associated with the user device and the channel configuration information, a customized channel lineup using the information associated with the set of channel lineups (block 450). For example, configuration management platform 210 can generate, based on the information associated with user device 205 and the channel configuration information, a customized channel lineup using the information associated with the set of channel lineups.

In some implementations, configuration management platform 210 can receive the information associated with user device 205, and identify a channel lineup that is applicable to user device 205. For example, configuration management platform 210 can identify a channel lineup that is applicable to a service area of user device 205, that includes channel categories to which user device 205 is subscribed, and/or the like.

In some implementations, configuration management platform 210 can compare the information associated with user device 205 and configuration information associated with the set of channels of the channel lineup. Additionally, or alternatively, configuration management platform 210 can modify the channel lineup to generate a customized channel lineup. For example, configuration management platform 210 can add information that is applicable to user device 205, remove information that is not applicable to user device 205, remove information that is not eligible to be received by user device 205, remove information based on restriction information, or the like.

In some implementations, configuration management platform 210 can determine particular channels, of the channel lineup, that are applicable to user device 205 based on the information associated with user device 205. For example, configuration management platform 210 can generate a custom channel lineup based on account information, profile information, user information, behavioral information, subscription information, restriction information, device information, connectivity information, location information, time frame information, and/or the like. In other words, configuration management platform 210 can compare the configuration information, associated with the set of channels, and the information associated with user device 205 when generating the customized channel lineup.

In some implementations, configuration management platform 210 can determine particular channel categories and/or particular channels that are to be included with the custom channel lineup. In some implementations, configuration management platform 210 can determine a display order associated with the channel categories based on, for example, account information, profile information, user information, behavioral information, subscription information, restriction information, device information, connectivity information, location information, time frame information, and/or the like. For example, a display order can identify an order in which the channel categories are to be provided for display. In other words, user device 205 can provide, for display, a list of channel categories in a particular order based on the display order (e.g., via a menu, or the like). Additionally, or alternatively, configuration management platform 210 can determine a display order associated with channels of a channel category. For example, a display order of channels can identify an order in which the channels are to be provided for display.

In some implementations, configuration management platform 210 can determine, based on account information of user device 205, another user device 205 that is associated with the account. Additionally, or alternatively, configuration management platform 210 can determine other channels (or channel categories) that are eligible to be provided to and/or received by the other user device 205 and that might not be capable of being provided to and/or received by the user device 205 (e.g., for which the custom channel lineup is being generated). Additionally, or alternatively, configuration management platform 210 can determine other channels that are eligible to be subscribed to by a user associated with user device 205. In some implementations, configuration management platform 210 can add the other channels to the custom channel lineup. In some implementations, configuration management platform 210 can add a channel to the custom channel lineup only when the probability of the user, associated with user device 205, being interested in the channel is above a threshold. Configuration management platform 210 can determine the probability based on account information, profile information, user information, behavioral information, subscription information, restriction information, device information, connectivity information, location information, time frame information, and/or the like.

In some implementations, configuration management platform 210 can determine particular channels, of the channel lineup, that are applicable to user device 205, and can generate the custom channel lineup using the particular channels. In this way, configuration management platform 210 can provide, to user device 205, the custom channel lineup, as described below.

As further shown in FIG. 4, process 400 can include providing, to the user device, information associated with the custom channel lineup after generating the custom channel lineup to permit the user device to provide, for display, the information associated with the custom channel lineup (block 460). For example, configuration management platform 210 can provide, to user device 205, information associated with the custom channel lineup to permit user device 205 to provide, for display, the information associated with the custom channel lineup.

In some implementations, user device 205 can receive the custom channel lineup, and provide, for display via a user interface, information associated with the custom channel lineup. For example, user device 205 can provide, for display, guide information, menu information, or the like, that includes a set of channel categories and a set of channels associated with the custom channel lineup.

In this way, a user can interact with user device 205 to navigate a guide that identifies the set of channels associated with the custom channel lineup, to view content metadata associated with the set of channels, to view schedule information associated with the set of channels, to select content for playback, or the like.

In some implementations, user device 205 can provide, for display, information associated with other channels that are capable of being provided to other user devices 205 associated with an account of a user, are capable of being subscribed to by a user of user device 205, or the like. In some implementations, user device 205 can provide a prompt that identifies that the other channels are capable of being recorded by another user device 205 associated with the account, are capable of being subscribed to by a user associated with user device 205, are capable of being provided for playback by another user device 205, or the like.

In some implementations, user device 205 can receive an input that identifies that particular content, that might not be capable of being provided for playback and/or recorded by user device 205, is to be recorded by another user device 205 associated with an account associated with user device 205. In some implementations, the other user device 205 can receive, based on the input, an instruction that causes the other user device 205 to request and record the particular content. As an example, assume that a user is using a first user device 205 (e.g., a smartphone). Additionally, assume that a second user device 205 (e.g., a set-top box) is associated with an account of the user. In this case, the user might interact with the first user device 205 to select content to be recorded by the second user device 205.

Some implementations described herein permit configuration management platform 210 to provide, to user device 205, a custom channel lineup that is customized to user device 205 based on a geolocation of user device 205, a type of user device 205, an access network connectivity of user device 205, an access point connectivity of user device 205, restriction information, behavioral information, etc. In this way, user device 205 can receive information associated with channels that are eligible to be received by user device 205, that include content that is applicable to a geolocation of user device 205, that are subscribed to by user device 205, that are not restricted for playback by user device 205, or the like.

In this way, some implementations described herein reduce an amount of inapplicable information that is provided to user devices 205, thereby conserving network resources and/or processor and/or memory resources of devices associated with an IPTV service.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Some implementations described herein conserve processor and/or memory resources of configuration management devices by reducing an amount of configuration and an amount of time associated with IPTV channel onboarding. For example, a network operator can interact with a client device to configure a set of channels with particular configuration information, to configure a set of channel categories, and/or to configure a set of channel lineups. Additionally, some implementations described herein provide a configuration management platform that can use the set of channel lineups in association with multiple services, thereby reducing a need of the network operator to configure individual services separately.

Additionally, some implementations described herein provide a configuration management platform to receive the configuration information, and provide to user devices, custom channel lineups based on user device specific information. In this way, user devices that are associated with different IPTV services, different geolocations, different device types, different subscriptions, different content restrictions, different access network connectivity, etc. can receive custom channel lineups that are generated by the configuration management platform based on the configuration information.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Certain user interfaces have been described herein and/or shown in the figures. A user interface can include a graphical user interface, a non-graphical user interface, a text-based user interface, etc. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      receive configuration information associated with a set of channels to be provided as part of an Internet protocol television (IPTV) service,
         the configuration information identifying whether a user device that is associated with the IPTV service is eligible for the set of channels,
            wherein whether the user device is eligible for the set of channels is based on whether the user device is connected to an in-home network or an out-of-home network;
      receive information associated with a set of channel categories after receiving the configuration information associated with the set of channels,
         a channel category, of the set of channel categories, including information associated with a subset of channels of the set of channels;
      receive information associated with a set of channel lineups after receiving the information associated with the set of channel categories,
         a channel lineup, of the set of channel lineups, including the information associated with the set of channel categories;
      receive information associated with the user device;
      receive information that identifies whether the user device is connected to the in-home network or the out-of-home network;
      determine, based on the information that identifies whether the user device is connected to the in-home network or the out-of-home network, a probability of a user, associated with the user device, being interested in a particular channel of the set of channels;
      generate, based on the information associated with the user device, the configuration information associated with the set of channels, and the information that identifies whether the user device is connected to the in-home network or the out-of-home network, a custom channel lineup using the information associated with the set of channel lineups,
         wherein the custom channel lineup selectively includes the particular channel based on whether the probability satisfies a threshold; and
      provide, to the user device, the custom channel lineup after generating the custom channel lineup to permit the user device to provide, for display, information associated with the custom channel lineup.

2. The device of claim 1, where the one or more processors are further to:
   receive information that identifies a device type of the user device; and
   where the one or more processors, when generating the custom channel lineup, are to:
      generate the custom channel lineup based on the device type of the user device.

3. The device of claim 1, where the one or more processors are further to:
   receive information that identifies a service area associated with the user device; and
   where the one or more processors, when generating the custom channel lineup, are to:
      generate the custom channel lineup based on the service area associated with the user device.

4. The device of claim 1, where the one or more processors are further to:
   receive information that identifies a first service area associated with the user device;
   identify the channel lineup using the information that identifies the first service area;
   identify another subset of channels, associated with the channel lineup, that are associated with the first service area; and
   where the one or more processors, when generating the custom channel lineup, are to:
      generate the custom channel lineup after identifying the other subset of channels,
         the custom channel lineup including information associated with the other subset of channels.

5. The device of claim 1, where the one or more processors are further to:
   generate the set of channel lineups using the channel category; and
   where the one or more processors, when providing the custom channel lineup, are to:
      provide the custom channel lineup after generating the set of channel lineups using the channel category.

6. The device of claim 1, where the set of channels include a set of channel types.

7. The device of claim 1, wherein the in-home network comprises an access network provided by a customer premises equipment, and wherein the out-of-home network comprises at least one of:
a radio access network,
a public access network, or
an access network that is not associated with a customer premises.

8. A non-transitory computer-readable medium storing instructions, the instructions comprising:
one or more instructions that, when executed by one or more processors, cause the one or more processors to:
receive configuration information associated with a set of channels to be provided as part of an Internet protocol television (IPTV) service,
the configuration information identifying whether a user device that is associated with the IPTV service is eligible for the set of channels,
wherein whether the user device is eligible for the set of channels is based on whether the user device is connected to an in-home network or an out-of-home network;
receive information associated with a set of channel categories after receiving the configuration information associated with the set of channels,
a channel category, of the set of channel categories, including information associated with a subset of channels of the set of channels;
receive information associated with a set of channels lineups after receiving the information associated with the set of channel categories,
a channel lineup, of the set of channel lineups, including information associated with the set of channel categories;
receive information associated with the user device;
determine whether the user device is connected to the in-home network or the out-of-home network;
determine, based on whether the user device is connected to the in-home network or the out-of-home network, a probability of a user, associated with the user device, being interested in a particular channel of the set of channels;
generate, based on the information associated with the user device, the configuration information associated with the set of channels, and whether the user device is connected to the in-home network or the out-of-home network, a custom channel lineup using the information associated with the set of channel lineups,
wherein the custom channel lineup selectively includes the particular channel based on whether the probability satisfies a threshold; and
provide, to the user device, information associated with the custom channel lineup to permit the user device to provide, for display, the information associated with the custom channel lineup.

9. The non-transitory computer-readable medium of claim 8, where the one or more instructions, when executed by the one or more processors, further cause the one or more processors to:
receive information that identifies a device type of the user device; and
where the one or more instructions, that cause the one or more processors to generate the custom channel lineup, cause the one or more processors to:
generate the custom channel lineup based on the device type of the user device.

10. The non-transitory computer-readable medium of claim 8, where the one or more instructions, when executed by the one or more processors, further cause the one or more processors to:
receive information that identifies a geolocation of the user device; and
where the one or more instructions, that cause the one or more processors to generate the custom channel lineup, cause the one or more processors to:
generate the custom channel lineup based on the information that identifies the geolocation of the user device.

11. The non-transitory computer-readable medium of claim 8, where the one or more instructions, when executed by the one or more processors, further cause the one or more processors to:
receive information associated with another user device that is associated with another IPTV service,
the other IPTV service being different than the IPTV service; and
generate another custom channel lineup, using information associated with the set of channel lineups, based on the information associated with the other user device that is associated with the other IPTV service.

12. The non-transitory computer-readable medium of claim 8, where the one or more instructions, when executed by the one or more processors, further cause the one or more processors to:
receive information that configures a channel, of the set of channels, to be used in association with a set of IPTV services,
the set of IPTV services including the IPTV service.

13. The non-transitory computer-readable medium of claim 8, where the set of channels include:
a linear channel; and
a video on demand channel.

14. The non-transitory computer-readable medium of claim 8, wherein the in-home network comprises an access network provided by a customer premises equipment, and wherein the out-of-home network comprises at least one of:
a radio access network,
a public access network, or
an access network that is not associated with a customer premises.

15. A method, comprising:
receiving, by a device, configuration information associated with a set of channels,
the set of channels being associated with an Internet protocol television (IPTV) service,
the configuration information identifying whether a user device that is associated with the IPTV service is eligible for the set of channels,
wherein whether the user device is eligible for the set of channels is based on whether the user device is connected to an in-home network or an out-of-home network;
receiving, by the device, information associated with a set of channel categories after receiving the configuration information associated with the set of channels;
receiving, by the device, information associated with a set of channel lineups after receiving the information associated with the set of channel categories;
receiving, by the device, information associated with the user device;
determining, by the device, whether the user device is connected to the in-home network or the out-of-home network;

determining, based on whether the user device is connected to the in-home network or the out-of-home network, a probability of a user, associated with the user device, being interested in a particular channel of the set of channels;

generating, by the device, a custom channel lineup using the information associated with the set of channel lineups and based on the information associated with the user device, the configuration information associated with the set of channels, and whether the user device is connected to the in-home network or the out-of-home network, wherein the custom channel lineup selectively includes the particular channel based on whether the probability satisfies a threshold; and providing, by the device and to the user device, the custom channel lineup after generating the custom channel lineup to permit the user device to provide, for display, information associated with the custom channel lineup.

16. The method of claim 15, further comprising:

receiving information that identifies a device type of the user device; and where generating the custom channel lineup comprises:
generating the custom channel lineup based on the information that identifies the device type of the user device.

17. The method of claim 15, further comprising:

receiving information that identifies a first service area identifier associated with the user device,
a channel lineup, of the set of channel lineups, including a first set of channels that are associated with the first service area identifier, and
the channel lineup including a second set of channels that are associated with a second service area identifier that is different than the first service area identifier; and where generating the custom channel lineup comprises:
generating the custom channel lineup using the first service area identifier,
the custom channel lineup including the first set of channels.

18. The method of claim 15, further comprising:

determining subscription information associated with the user device; and where generating the custom channel lineup comprises:
generating the custom channel lineup based on the subscription information.

19. The method of claim 15, further comprising:

determining content restriction information associated with the user device; and where generating the custom channel lineup comprises:
generating the custom channel lineup based on the content restriction information.

20. The method of claim 15, wherein the in-home network comprises an access network provided by a customer premises equipment, and wherein the out-of-home network comprises at least one of:

a radio access network, a public access network, or an access network that is not associated with a customer premises.

* * * * *